(12) United States Patent
Kramer et al.

(10) Patent No.: US 11,586,984 B2
(45) Date of Patent: Feb. 21, 2023

(54) METHOD FOR VERIFYING THE PRODUCTION PROCESS OF FIELD DEVICES BY MEANS OF A MACHINE-LEARNING SYSTEM OR OF A PROGNOSIS SYSTEM

(71) Applicant: Endress+Hauser Group Services AG, Reinach (CH)

(72) Inventors: Tommi Dirk Kramer, Forst (DE); Patrick Galli, Vogtsburg (DE); Hans Joachim Fröhlich, Arlesheim (CH); Ulrich Kaiser, Basel (CH); Thomas Fricke, Nesselwang (DE); Enrico Mario De Stasio, Fey (CH)

(73) Assignee: Endress+Hauser Group Services AG, Reinach (CH)

( * ) Notice: Subject to any disclaimer, the term of this patent is extended or adjusted under 35 U.S.C. 154(b) by 267 days.

(21) Appl. No.: 16/901,692

(22) Filed: Jun. 15, 2020

(65) Prior Publication Data
US 2020/0395132 A1 Dec. 17, 2020

(30) Foreign Application Priority Data
Jun. 13, 2019 (DE) ...................... 10 2019 116 139.8

(51) Int. Cl.
*G06N 20/00* (2019.01)
*G16Y 40/40* (2020.01)
(Continued)

(52) U.S. Cl.
CPC ......... *G06N 20/00* (2019.01); *G05B 19/0428* (2013.01); *G06N 3/04* (2013.01);
(Continued)

(58) Field of Classification Search
CPC ...... G05B 19/0428; G06N 3/04; G06N 20/00; G06N 3/08; G16Y 10/25; G16Y 10/75;
(Continued)

(56) References Cited

U.S. PATENT DOCUMENTS 10,003,508 B1\* 6/2018 Cogan ..................... H04L 41/16
10,878,335 B1\* 12/2020 Waugh .................... G06F 40/30
(Continued)

FOREIGN PATENT DOCUMENTS

DE 4447288 A1 7/1995
DE 69111861 T2 4/1996

*Primary Examiner* — Michael A Keller
(74) *Attorney, Agent, or Firm* — Kelly J. Smith; Endress+Hauser (USA) Holding Inc.

(57) ABSTRACT

The present disclosure relates to a method for verifying the production process of field devices, including a step of accessing a service platform on which data from field devices, including identification data, the respective type of field device, configuration data, containing application-specific data, environment information of the field devices or parameter data, data relating to the production date of a respective field device and repair or troubleshooting cases of the field devices are stored. The method also includes steps of detecting anomalies by statistically evaluating the repair or troubleshooting cases stored on service platform and creating a notification in the event of a detected anomaly, supplying the data of the field devices and the notifications to a machine learning or prognosis system, and evaluating the data of the field devices and the notifications by means of the machine learning or prognosis system for forecasting series errors of the field devices.

7 Claims, 2 Drawing Sheets

(51) Int. Cl.
  *G06N 3/04* (2023.01)
  *G16Y 30/00* (2020.01)
  *G05B 19/042* (2006.01)
  *G16Y 10/25* (2020.01)
  *G16Y 10/75* (2020.01)
  *G16Y 20/20* (2020.01)
  *G16Y 40/20* (2020.01)

(52) U.S. Cl.
  CPC .............. *G16Y 10/25* (2020.01); *G16Y 10/75* (2020.01); *G16Y 20/20* (2020.01); *G16Y 30/00* (2020.01); *G16Y 40/20* (2020.01); *G16Y 40/40* (2020.01)

(58) Field of Classification Search
  CPC ........ G16Y 20/20; G16Y 30/00; G16Y 40/20; G16Y 40/40
  See application file for complete search history.

(56) References Cited

U.S. PATENT DOCUMENTS

| | | | | |
|---|---|---|---|---|
| 2009/0055692 | A1* | 2/2009 | Kroupnova | G05B 23/00 718/1 |
| 2009/0210364 | A1* | 8/2009 | Adi | G06N 5/025 706/59 |
| 2013/0304245 | A1 | 11/2013 | Lam et al. | |
| 2018/0314573 | A1* | 11/2018 | Chang | G06N 20/00 |
| 2019/0306327 | A1* | 10/2019 | Matysiak | G06F 3/167 |
| 2020/0084170 | A1* | 3/2020 | Mutha | G06N 20/00 |

* cited by examiner

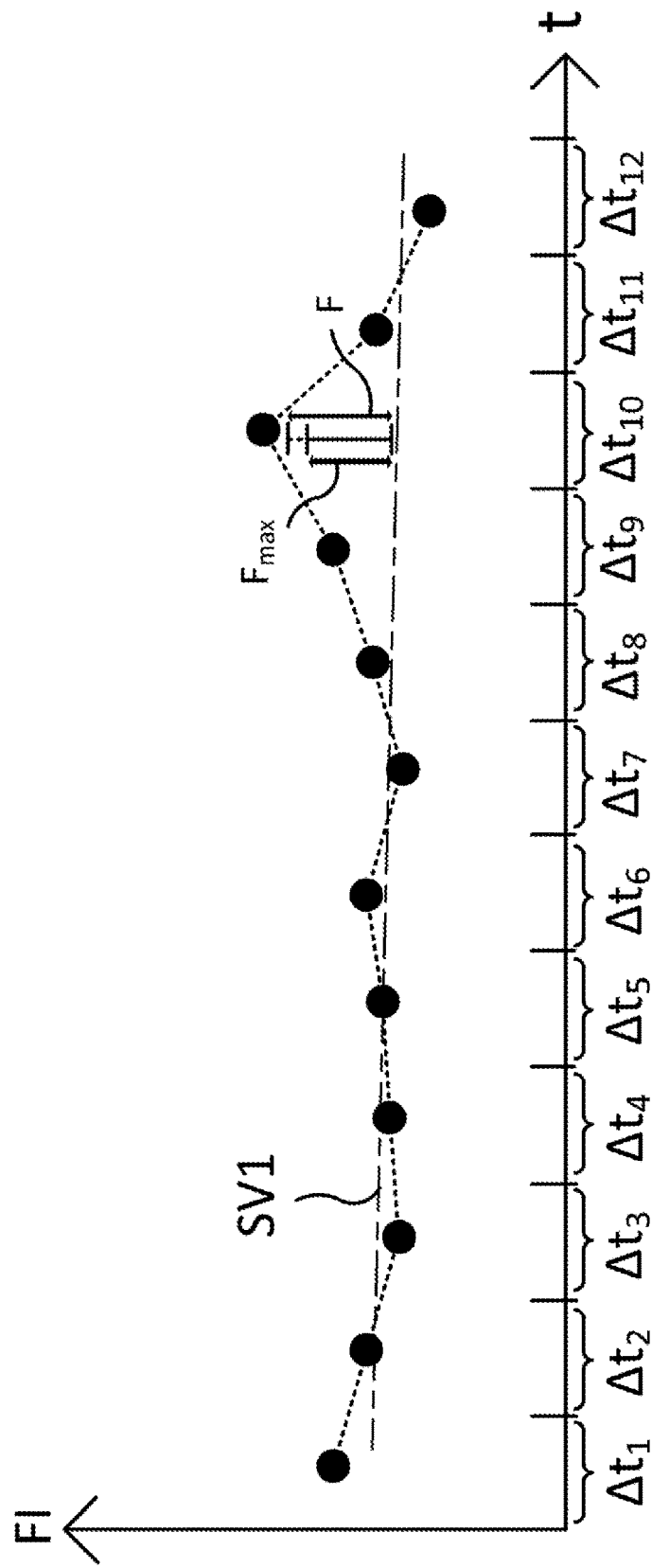

METHOD FOR VERIFYING THE PRODUCTION PROCESS OF FIELD DEVICES BY MEANS OF A MACHINE-LEARNING SYSTEM OR OF A PROGNOSIS SYSTEM

CROSS-REFERENCE TO RELATED APPLICATION

The present application is related to and claims the priority benefit of German Patent Application No. 10 2019 116 139.8, filed on Jun. 13, 2019, the entire contents of which are incorporated herein by reference.

TECHNICAL FIELD

The present disclosure relates to a method for verifying the production process of field devices of automation technology.

BACKGROUND

Field devices that are used in industrial automation technology systems are already known from the prior art. Field devices are often used in process automation as well as in manufacturing automation. Field devices, in general, refer to all devices which are process-oriented and which supply or process process-relevant information. Field devices are thus used for detecting and/or influencing process variables. Sensor units are used for detecting process variables. Such measuring devices are used, for example, for pressure and temperature measurement, conductivity measurement, flow measurement, pH measurement, fill level measurement, etc., and detect the corresponding process variables of pressure, temperature, conductivity, pH value, fill level, flow, etc. Actuators are used for influencing process variables. These actuators are, for example, pumps or valves that can influence the flow of a fluid in a pipe or the fill level in a tank. In addition to the aforementioned measuring devices and actuators, field devices are also understood to include remote I/O's, radio adapters, or, generally, devices that are arranged at the field level.

The failure of a field device sometimes means high investments in costs and time. Particularly in critical processes, the relevant system section has to be shut down until the field device has been repaired or replaced. As an alternative thereto, redundancies are often installed in advance in the relevant system section. As a rule, these are field devices which are identical to the field devices used and which replace a relevant field device in the event of a fault.

Sometimes it is difficult to determine the exact cause of a failure or defect of a field device. In particular, it is desirable to determine whether a failure of a field device is an individual case or whether similar failures are to be expected for field devices from the same series. Heretofore, however, the detection of series errors occurs reactively, unsystematically or due to a subjectively perceived cumulation of complaints or service events a series of field devices.

As a result, series errors of field devices can sometimes only be detected with a long time delay, which entails an increase in the damage cases in the field before remedial action is possible. This increases the risk of damage, as well as the costs for remedial action and possible damage correction.

In the patent application entitled "Method for verifying the production process of field devices of automation technology" filed on the same filing date, there is a description that a possible series error of field devices can be detected by statistically evaluating data of the field devices on a service platform. However, this merely relates to the possibility that a series error could have occurred without verifying whether this is actually the case. False-positive series errors are sometimes detected, which may potentially trigger a high administrative act by verifying the field devices putatively affected.

SUMMARY

In the light of this problem, the present disclosure is based on the object of providing a method which allows false-positive predictions of series errors of field devices to be reduced.

The object is accomplished by a method for verifying the production process of field devices of automation technology, accessing a service platform on which data from field devices, comprising identification data, the respective type of field device, configuration data, application-specific data, environment information of the field devices, data relating to the production date of a respective field device and repair and/or troubleshooting cases of the field devices are stored in a correlated manner.

The method also includes a step of detecting anomalies by statistically evaluating the repair or troubleshooting cases stored on service platform and creating a notification in the event of a detected anomaly; supplying the data of the field devices and the notifications to a machine learning or prognosis system; and evaluating the data of the field devices and the notifications by means of the machine learning or prognosis system for forecasting series errors of the field devices.

One advantage of the method according to the present disclosure is that there can be a determination of whether statistical anomalies determined by the service platform actually indicate series errors of field devices. False-positive series errors, which result in manual effort for putative remediation, are reduced.

The detection of anomalies is carried out in particular by an application which is integrated on the service platform.

The machine learning or prognosis system verifies the notifications on the basis of the data relating to the field devices. For example, a putative series error, which is detected by a cumulation of repair and/or troubleshooting cases within a specific period of time, can thus be rebutted by the fact that the putatively affected devices were used in an inappropriate application. This detected anomaly therefore corresponds to an operating error and is not an indication of a series error.

According to an advantageous embodiment of the method according to the present disclosure, it is provided that the machine learning and/or prognosis system additionally predicts a probable point in time of an occurrence of a functional incapacity or a serious error case, at the corresponding field devices.

An advantageous embodiment of the method according to the present disclosure provides that the machine learning or prognosis system learns defined types of series errors by means of an expert system.

According to a preferred embodiment of the method according to the present disclosure, it is provided that, after learning, the machine learning or prognosis system predicts the defined types of series errors and new types of series errors by evaluating the data of the field devices and the notifications. Thus, not only can already known types of series errors be detected—the neural network can moreover autonomously learn new, previously unknown types of series errors.

In order to achieve an advantageous embodiment of the method according to the present disclosure, it is provided that the machine learning or prognosis system calculates an index for each predicted series error, which index represents a measure of the probability of the predicted series error. An absolute statement as to whether a series error was detected can only be determined with difficulty by a machine learning or prognosis system, such as a neural network. By means of the index, however, how high the probability is for this can be estimated. For example, it can be provided to output an index having a value between 0 and 1. The greater the index, the higher the probability. In addition, it can be provided that the machine learning or prognosis system has two outputs and carries out an internal classification of the detected series errors on the basis of the index. Provision can thus be made for those series errors to be output at the first output (positive output), the index of which is greater than or greater equal to a predetermined value, for example 0.5. To this end, those series errors whose index is less than 0.5 are output at the second output (negative output).

An advantageous embodiment of the method according to the present disclosure provides that the machine learning or prognosis system uses a neural network. However, any type of further conventional machine learning algorithms or prognosis algorithms, for example Bayes classifier algorithms, linear regression algorithms, linear regression algorithms, random forest algorithms, etc., can be used.

According to a first variant of the method according to the present disclosure, the machine learning or prognosis system is integrated on the service platform. In this case, the machine learning or prognosis system can be configured as an application. The notification is transmitted internally between the application, which carries out the determination of the anomalies, to the application with the machine learning or prognosis system.

According to a first variant of the method according to the present disclosure, the machine learning or prognosis system is integrated on a further service platform. In this case, the machine learning or prognosis system can be configured as an application. The notification is transmitted internally between the application, which carries out the determination of the anomalies, to the application with the machine learning or prognosis system.

An advantageous embodiment of the method according to the present disclosure provides that the service platform and/or the further service platform are embedded in a cloud architecture and can be contacted via the Internet. In this case, cloud computing is understood to mean storing information and accessing the stored information via the Internet. The service platform enables the applications mentioned and further applications to be performed.

BRIEF DESCRIPTION OF THE DRAWINGS

The present disclosure is explained in greater detail with reference to the following figure. This show:

FIG. 2 shows an embodiment for determining a series error.

DETAILED DESCRIPTION

Figure 1:
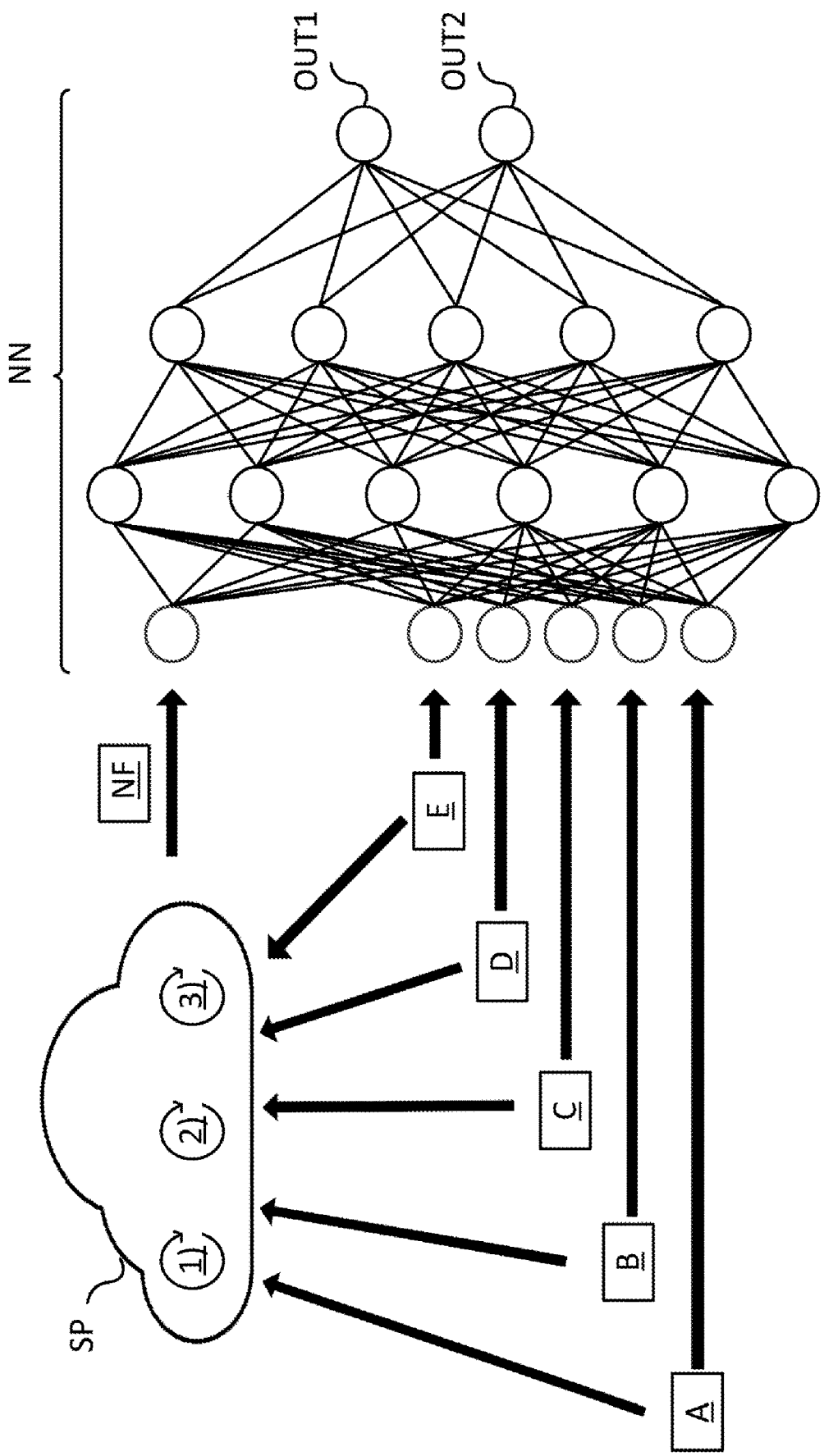
FIG. 1 shows a schematic overview of the method according to the present disclosure.

The method according to the present disclosure is schematically depicted in FIG. 1. From a plurality of data sources, data A, B, C, D, E is collected from field devices and is determined for a cloud-based service platform SP. The data A, B, C, D, E originate mainly from databases of the user of the field devices and are transmitted via the Internet to the service platform SP. It can also be provided that a user accesses the service platform SP via the Internet and manually inputs the data A, B, C, D, E into such service platform. Alternatively, the field devices themselves collect data, at least part of the data A, B, C, D, E, and transmit it directly via the Internet, or indirectly via one or a plurality of subnetworks and network subscribers, to the service platform.

The data A, B, C, D, E is, in particular, comprehensive identification data A of the field device (serial number, tag, etc.), the respective type B of a field device (for example, capacitive limit level meter "Liquipoint FTW23"), configuration data C (data containing hardware components, software components and/or parameter data of a field device) and data D relating to the production date of a respective field device. Furthermore, repair and/or troubleshooting cases E are collected and stored on that of the service platform SP.

One or more applications are implemented on the service platform SP, which applications perform the following method steps 1), 2), 3) as automated processes.

In a first method step 2), the data A, B, C, D, E is analyzed statistically. For this purpose, the data A, B, C, D, E is processed and compared with a statistical distribution curve SV1, SV2 and deviations F of the real data A, B, C, D, E from the statistical distribution curve SV1, SV2 are determined. The data A, B, C, D, E can also be filtered for this purpose before the statistical comparison regarding specific field device types or specific applications of the field devices. In the event that deviations occur, such deviations can indicate a series error in the production of the field devices.

In a second method step 2), in such a case a notification NF is generated which contains information about the series error, the date of the production affected and possibly the type of field devices concerned.

In a third method step 3), there is a determination of which users have/use one or a plurality of the field devices which are affected by the series error (=devices produced in a production period/production interval which have cumulative repair and/or troubleshooting cases). The notification NF is then transmitted to such users via the Internet, so that such users can take suitable action, for example in the form of the maintenance/repair or replacement of the field devices.

Before the third method step 3) is carried out, the notification NF and the data A, B, C, D, E of the field devices are transmitted to a machine learning or prognosis system, specifically to a neural network NN. This is a multilayer neural network with two outputs. The notification NF is analyzed by the neural network NN. All data A, B, C, D, E available for the putatively affected field devices is included for the analysis. In particular, application-specific data of the field devices is analyzed.

The neural network NN determines whether the notification NF combined with the data A, B, C, D, E corresponds to one or more known types of series errors and calculates an index which quantifies a probability of an occurrence of a series error. Depending on the index, the result of the analysis is output at one of the two outputs OUT1, OUT2 of the neural network NN. It is thus possible to provide for the result to be output at the first output OUT1 if the index is greater than or is greater equal to a predetermined value, for example 0.5. Otherwise, the result is output at the second output.

FIG. 2 shows an exemplary embodiment of the statistical determination of series errors. Further examples of this are disclosed in the patent application filed on the same filing date, entitled "Method for verifying the production process of field devices of automation technology," the content of which is explicitly to be brought into the disclosure of the present patent application.

FIG. 2 shows a diagram, the abscissa of which shows a time curve t and the ordinate of which represents the value of an error index FI. The aim is to process the data of the field devices A, B, C, D, E in such a way that failure statistics in the form of the error index can be generated over the respective production periods of the field devices. For this purpose, production intervals Δt are fixed in a first step. The length of a production interval Δt may be freely determined. It has been found that dividing into 1-week intervals or 1-month intervals is advantageous. The temporal start and end point of the overall analysis (for example, starting point: Jan. 1, 2016; endpoint: Dec. 31, 2016) can be freely determined.

On the basis of the data D, all field devices are then determined, which are produced in a respective production interval Δt, in order to determine the number of all field devices produced in a respective production interval.

The timing of the repair and/or troubleshooting cases E is subsequently analyzed and, for each production interval Δt, the sum of all repair and/or troubleshooting cases E, which occurred between the start point of the production interval and the current date, of the field devices that were produced in a respective production interval Δt, is determined. The error index FI is calculated in each case, wherein the error index FI represents the ratio of the sum of the repair and/or troubleshooting cases E to the number of field devices produced. The error index FI thus represents a measure of the production quality. The higher the error index FI, the higher the number of errors of the field devices which were produced in the corresponding production interval Δt.

FIG. 2 now plots the error index FI of all field devices produced in 2016, divided into production intervals Δt which represent the respective month of production. $\Delta t_1$ thus relates to the production period January 2016, $\Delta t_{12}$ correspondingly relates to the production period December 2016. The time profile of the error index is compared with a first statistical distribution curve SV1. In the present case, the curve corresponds to a linear function which decreases with time. This results from the fact that, assuming that the production technique remains the same over the year 2016, the sum of the repair and/or troubleshooting cases E becomes less as time progresses, since the time interval of a production interval Δt decreases to the present date. Thus, statistically between $\Delta t_1$ and the present date in total more repair and/or troubleshooting cases E occur for the field devices produced in $\Delta t_1$ than between $\Delta t_{12}$ up to the present date for the field devices produced in $\Delta t_{12}$.

For each production interval Δt, a deviation F1 of the respective error index FI is determined by the first statistical distribution curve SV1. If such deviation F1 is greater than a predetermined factor $F_{max1}$, the above-described notification is generated. In the present case, the deviation F1 for the production interval $\Delta t_{12}$ exceeds the predetermined factor $F_{max1}$. This could indicate a series error in the production process, since the field devices produced in the time interval $\Delta t_{10}$ have a higher probability of failure than the field devices produced in the other time intervals. For more accurate analysis, field device data could be limited to specific field device types or applications, in order to repeat the method described above with a specific error index. In such a case, the production interval Δt may also be reduced in order to further localize the field devices concerned.

The invention claimed is:

1. A method for verifying the production process of field devices of automation technology, comprising:
storing data from field devices, including: field device identification data; field device type; field device application-specific data; field device environment information; field device production date; and field device repair or troubleshooting events in a correlated manner on a service platform;
detecting anomalies by statistically evaluating the stored repair or troubleshooting and creating a notification in the event of a detected anomaly;
supplying the data of the field devices and the notifications to a machine learning or prognosis system; and
evaluating the data of the field devices and the notifications by means of the machine learning or prognosis system for forecasting series errors of the field devices;
wherein the machine learning or prognosis system learns defined types of series errors using an expert system;
wherein, after learning, the machine learning or prognosis system predicts the defined types of series errors and new types of series errors by evaluating the data of the field devices and the notification;
wherein the machine learning or prognosis system calculates an index for each predicted series error, which index represents a measure of the probability of the predicted series error.

2. The method of claim 1, wherein the machine learning or prognosis system additionally predicts a probable point in time of an occurrence of a functional incapacity or a serious error case at the corresponding field devices.

3. The method of claim 1, wherein the machine learning or prognosis system uses a neural network.

4. The method of claim 1, wherein the machine learning or prognosis system is integrated on the service platform.

5. The method of claim 4, wherein the machine learning or prognosis system is integrated on a further service platform.

6. The method of claim 5, wherein the service platform or the further service platform is embedded in a cloud architecture and can be contacted via the Internet.

7. A method for verifying the production process of field devices of automation technology, comprising:
accessing a service platform on which storing data from field devices, including: field device identification data; the respective type of field device type; configuration data; containing field device application-specific data; field device environment information of the field devices or parameter data; data relating to the field device production date of a respective field device; and field device repair or troubleshooting cases events of the field devices are stored in a correlated manner on a service platform;
detecting anomalies by statistically evaluating the stored repair or troubleshooting cases stored on the service platform and creating a notification in the event of a detected anomaly;
supplying the data of the field devices and the notifications to a machine learning or prognosis system; and
evaluating the data of the field devices and the notifications by means of the machine learning or prognosis system for forecasting series errors of the field devices;

wherein the machine learning or prognosis system learns defined types of series errors using an expert system;

wherein the machine learning or prognosis system distinguishes between series errors and operating errors.

* * * * *